United States Patent
Vercaemst

(10) Patent No.: US 11,578,233 B2
(45) Date of Patent: Feb. 14, 2023

(54) MANGANESE-BEARING POLYMER COMPLEXES

(71) Applicant: UMICORE, Brussels (BE)

(72) Inventor: Carl Vercaemst, Bruges (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 17/618,940

(22) PCT Filed: Apr. 23, 2020

(86) PCT No.: PCT/EP2020/061309
§ 371 (c)(1),
(2) Date: Dec. 14, 2021

(87) PCT Pub. No.: WO2020/254013
PCT Pub. Date: Dec. 24, 2020

(65) Prior Publication Data
US 2022/0204806 A1     Jun. 30, 2022

(30) Foreign Application Priority Data

Jun. 20, 2019 (EP) .................................... 19181433

(51) Int. Cl.
*C09D 167/08* (2006.01)
*C08G 18/28* (2006.01)
(Continued)

(52) U.S. Cl.
CPC ......... *C09D 167/08* (2013.01); *C08G 18/281* (2013.01); *C08G 18/3206* (2013.01); *C08G 18/341* (2013.01); *C08G 18/38* (2013.01); *C08G 18/6755* (2013.01); *C08G 18/755* (2013.01); *C08G 18/7621* (2013.01); *C08G 63/681* (2013.01); *C08G 69/42* (2013.01); *C09D 175/04* (2013.01); *C09D 177/00* (2013.01)

(58) Field of Classification Search
CPC ...... C08G 18/36; C08G 63/681; C08G 69/42; C08L 75/06; C09D 167/08; C09D 175/04; C09D 177/00
See application file for complete search history.

(56) References Cited

U.S. PATENT DOCUMENTS

| 4,659,380 A * | 4/1987 | Winters | ............... C09D 167/08 106/14.14 |
| 2013/0331487 A1* | 12/2013 | Hage | .................... C09D 167/08 524/92 |

FOREIGN PATENT DOCUMENTS

| EP | 1382648 A1 | 1/2004 |
| WO | 2011098583 A1 | 8/2011 |

(Continued)

OTHER PUBLICATIONS

ISA/EP; International Search Report and Written Opinion for International Patent Application No. PCT/EP2020/061309 dated Jun. 19, 2020, 10 pages.

*Primary Examiner* — Michael L Leonard
(74) *Attorney, Agent, or Firm* — NK Patent Law

(57) ABSTRACT

The invention concerns a composition for use as drier in auto-oxidizable coatings or as accelerator in unsaturated polyester resins, comprising a manganese-bearing polymer having a manganese dicarboxylate repeating unit and at least one nitrogen-containing donor ligand. Such compositions offer excellent drying performances. They ensure a strongly reduced leachability of manganese compared to that of known manganese-bearing driers.

12 Claims, 3 Drawing Sheets

(51) Int. Cl.
  *C08G 18/32* (2006.01)
  *C08G 18/34* (2006.01)
  *C08G 18/38* (2006.01)
  *C08G 18/67* (2006.01)
  *C08G 18/75* (2006.01)
  *C08G 18/76* (2006.01)
  *C08G 63/68* (2006.01)
  *C08G 69/42* (2006.01)
  *C09D 175/04* (2006.01)
  *C09D 177/00* (2006.01)

(56) References Cited

FOREIGN PATENT DOCUMENTS

| | | |
|---|---|---|
| WO | 2011098584 A1 | 8/2011 |
| WO | 2011098587 A1 | 8/2011 |
| WO | 2012000934 A1 | 1/2012 |
| WO | 2013092441 A1 | 6/2013 |
| WO | 2013092442 A1 | 6/2013 |
| WO | 2014095670 A1 | 6/2014 |
| WO | 2014137307 A1 | 9/2014 |

\* cited by examiner

MANGANESE-BEARING POLYMER COMPLEXES

CROSS-REFERENCE TO RELATED APPLICATIONS

This application is a U.S. National Stage application of International Patent Application No. PCT/EP2020/061309, filed on Apr. 23, 2020, which claims the benefit of European Patent Application No. 19181433.4, filed on Jun. 20, 2019.

The present disclosure relates to manganese-bearing polymer complexes for use as driers in auto-oxidizable coating compositions, such as alkyd-based paints and varnishes, or as accelerators in unsaturated polyester resins (UPR).

Oil-modified polyester resins, referred to as alkyd resins, outline one of the major classes of surface coating resins. Since the early nineties, they have been widely applied in paints and varnishes, encompassing all the different protective surface coating market segments. Their popularity is no surprise as alkyd-based coatings are tough, strong adherent to many different types of surfaces, they are durable, impervious, and weather resistant and display excellent gloss appearance. Moreover, alkyds are largely derivable from agricultural products making them relatively green and biodegradable. In the last decade, much effort has also gone into alkyd-based coating compositions with low content of volatile organic compounds (VOC) and high content of sustainable bio-sourced ingredients.

Cobalt-based driers and accelerators, while still being considered as the most widely applicable primary driers and UPR accelerators on the market, are under regulatory pressure due to their potential toxicity. Manganese-based compounds such as carboxylates have therefore received significant attention as substitutes for cobalt-based compounds. Though widely used in ink drying applications at elevated temperature, manganese carboxylates are insufficiently reactive to oxidatively cure coatings like paints and varnishes in ambient conditions. Other problems are related to the yellowing induced by manganese-based driers, especially when used at higher concentrations.

It is known that the addition of specific chelating ligands can enhance the activity of manganese-based drying agents. Manganese driers containing Mn-bipyridyl and Mn-acetylacetonate are described by Gorkum et al. (EP1382648 A1). Although these driers reveal improved drying performance in comparison to traditional manganese carboxylates, the performance in terms of tack-free time and yellowing does not match that of cobalt-based driers.

In 2005, bridged di-nuclear manganese complexes [$Mn^{IV}$($\mu$-O)$_3$L$_2$](PF$_6$)$_2$, in which the ligand L is 1,4,7-trimethyl-1,4,7-triazacyclononane, are described by Oyman et al. (Surf. Coatings. Int. Part B, Coatings Transactions, 88, 269, 2005). These complexes show a relatively good drying activity in different alkyd paint formulations. WO2011/098583, WO2011/098584 and WO2011/098587 also describe similar bridged di-nuclear manganese complexes. Replacing the (PF6)2 anion by a carboxylate anion in the bridged Mn-complex described by Oyman, results in improved drying activity.

Nevertheless, as described in WO2013092441, WO2013092442 and WO2014095670, these bridged di-nuclear manganese complexes are still inferior to traditional cobalt driers. The amount of manganese required to get acceptable paint drying can be significantly reduced by using a molar excess of 1,4,7-trimethyl-1,4,7-triazacyclononane. The drying rate can be improved while keeping yellowing of the paint under control. But despite all progress that has been made in the development of manganese driers, they still do not reach the performance of cobalt in many paint formulations.

An additional disadvantage of these manganese complexes is their relatively high water solubility, which implies also high bio-availability. To date, manganese carboxylates don't have any carcinogenic, mutagenic or toxic to reproduction (CMR) classification. However, manganese is a neurotoxic agent and its reproductive toxicity ("reprotoxicity") and carcinogenicity are still questionable. Although manganese presents not as much of a health hazard as cobalt, a product with low water solubility - and thus lower bio-availability - of manganese is certainly preferred.

Low solubility manganese-based polymer driers are known from WO2012000934 and WO2014137307. They however offer inferior reactivity, which is still adequate for inks but too low for use in coating formulations at ambient conditions. One reason for that might be a steric hinderance effect. For example, Egboh teaches in his thesis "Synthesis and characterization of polyurethane ionomers and graft copolymers" (University of London, 1982, page 62) that a sterically hindered polymer molecule is relatively inactive for physical reasons, for the active groups cannot be reached by the reagents due to the size, number and close proximity of other substituents on the molecule. These substituent groups inhibit the approach of reagents and tend to diminish the reactivity of the functional groups. As manganese is part of the polymer backbone, also the formation of bridged di-nuclear manganese complexes, as described in the above citations, is highly unlikely.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Surprisingly, it has now been found that nitrogen-containing chelating ligands readily coordinate with manganese in the polymer chain, and that such manganese-based polymers do benefit greatly from an activating effect of these chelating ligands. The drying performance is drastically enhanced despite the steric hinderance effect. An additional unexpected finding is that the manganese-based polymer structure is apparently preserved after complexation, as corroborated by the fact that manganese remains essentially insoluble. This is beneficial with regards to the afore mentioned issues of reprotoxicity and carcinogenicity.

One other aspect, which is often overlooked, is the so-called "loss-of-dry" (LOD), i.e. the loss of drying performance as a function of paint storage time. This is of particular importance for pigmented systems in which the paint drier either adsorbs to the surface of pigments or is deactivated. Known compounds such as Mn-bipyridyl, Mn-acetylacetonate, and bridged di-nuclear manganese complexes can display significant loss-of-dry, even in presence of secondary driers.

Surprisingly, it has now been found that the chelated manganese polymers according to this invention offer strongly enhanced loss-of-dry performance compared to other known manganese-based complexes. This is particularly important as loss-of-dry otherwise severely limits the shelf life of the coating formulations.

A further advantage of the manganese-bearing polymer complexes is the enhanced compatibility and stability in alkyd-based paints. The properties of the manganese-based polymer driers can indeed easily be fine-tuned by altering the chemistry of the polymer backbone.

Moreover, yellowing remains very low.

Figure 1:
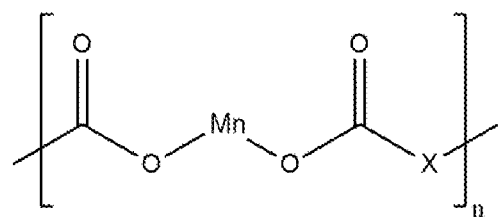
FIG. 1 is a chemical structure showing a manganese-bearing polymer having a repeating unit.

The invention concerns a composition for use as drier in auto-oxidizable coatings or as accelerator in unsaturated polyester resins, comprising a manganese-bearing polymer having a repeating unit according to FIG. 1, wherein X is one or more groups from the list comprising a hydrocarbon chain, an ester, a polyester, a urethane, a polyurethane, an amide, and a polyamide; wherein n is ≥2; and at least one donor ligand from the list comprising bidentate, tridentate, pentadentate, and hexadentate nitrogen ligands comprising at least two chelating nitrogen atoms. FIG. 1 shows that the manganese is part of the backbone of the polymer, wherein it is bound as a dicarboxylate.

It is to be noted that a composition "for use as drier in auto-oxidizable coatings", has implicitly to be at least partially soluble in the targeted paints or varnishes, which are typically based on organic compounds, in particular on oils such as vegetable oils. A composition "for use as accelerator in unsaturated polyester resins" has implicitly to be at least partially soluble in the targeted resins.

Manganese-bearing polymers having a mean molecular weight of at least 900 Da are preferred. The mean molecular weight can be estimated from the remaining free functionalities of the polymer, or by any appropriate analytical technique such as for example GPC (Gel Permeation Chromatography) or DLS (Dynamic Light Scattering).

Figure 2:
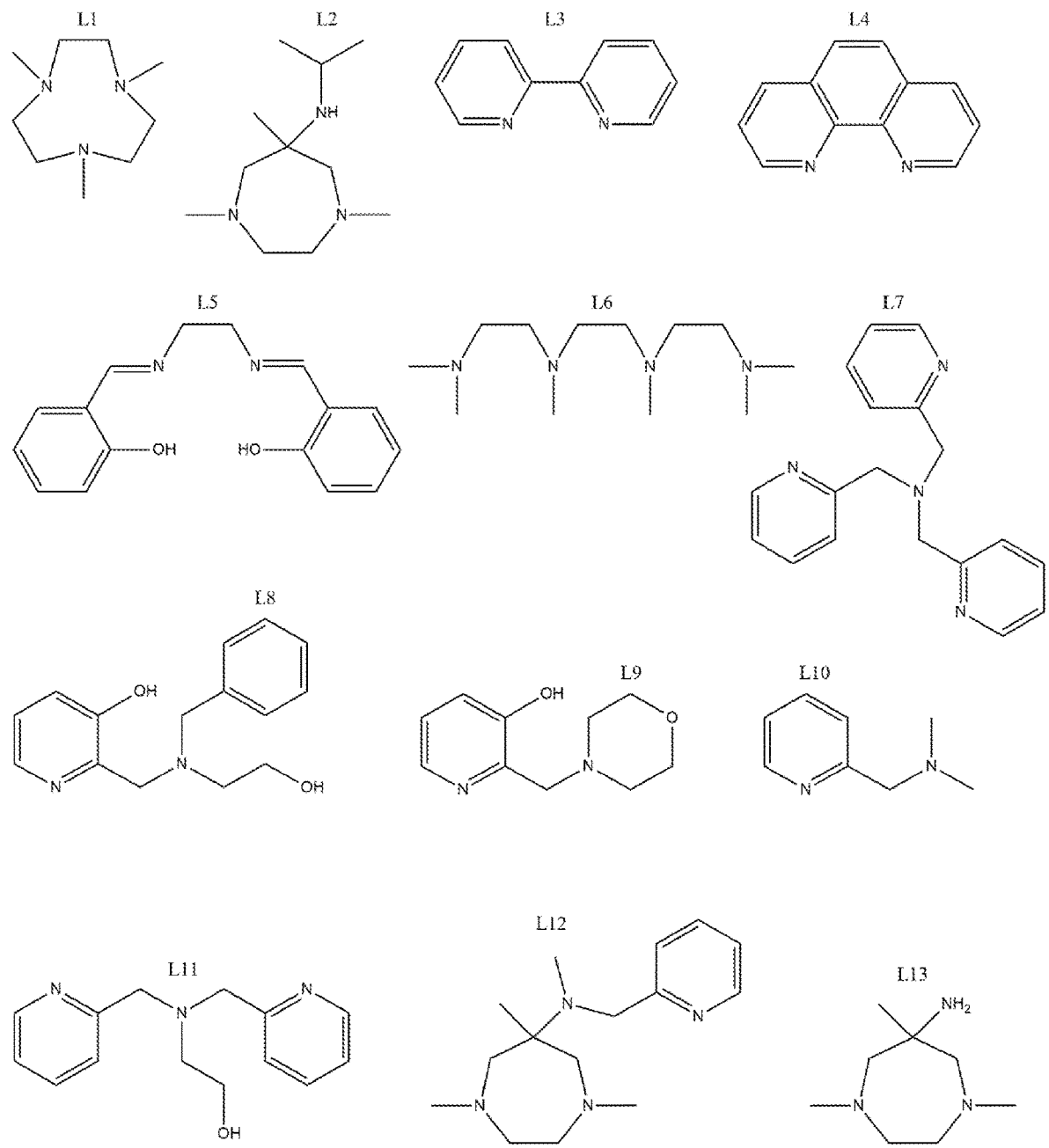
FIG. 2 is a series of chemical structures (L1-L13) showing potential chelating ligands.

A preferred embodiment concerns a drier composition, wherein the donor ligand is one or more of the chelating ligands illustrated in FIG. 2, wherein the molar ratio of ligand to manganese is at least 0.005, more preferably at least 0.05. It is assumed that during drying, a fraction of the activated manganese polymers gets immobilized in the paint and is not available anymore for further catalytic reactions.

Preferable ratios of ligand to manganese are between 0.2 and 10, more preferably between 0.5 and 5.

Figure 3:
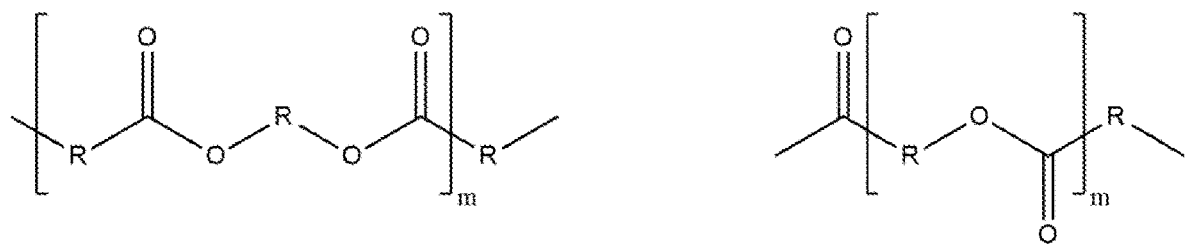
FIG. 3 shows two chemical structures representing an ester or a polyester.

In another preferred embodiment group X in FIG. 1 is an ester or polyester according to FIG. 3 (with m≥1). In another preferred embodiment group X in FIG. 1 is a urethane or polyurethane according to FIG. 4 (with m≥1). In another preferred embodiment group X in FIG. 1 is an amide or polyamide according to FIG. 5 (with m≥1).

Figure 4:
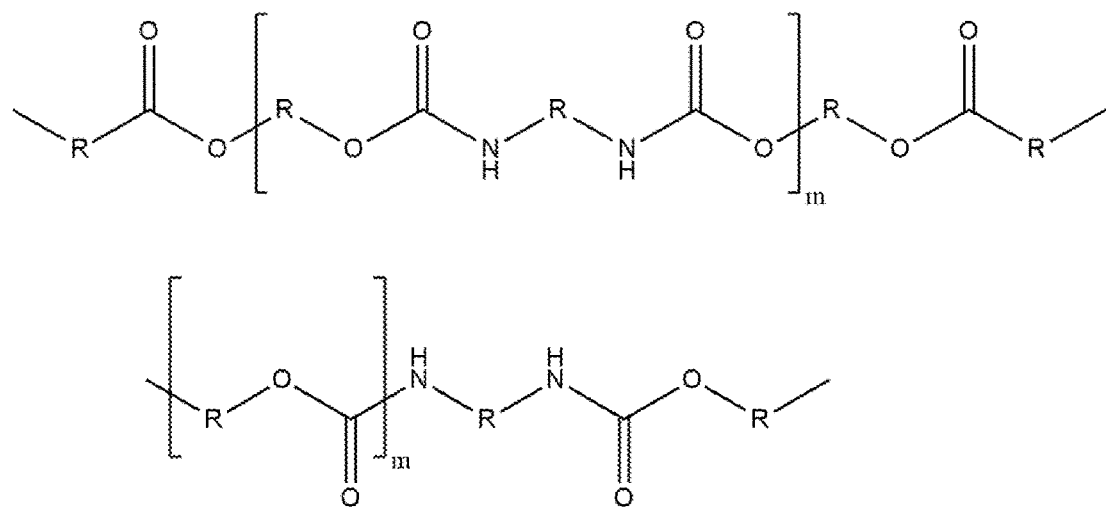
FIG. 4 is a shows two chemical structures representing a urethane or polyurethane.
Figure 5:
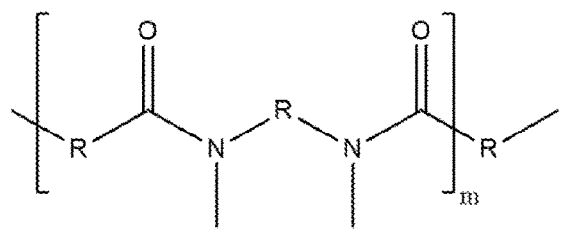
FIG. 5 is a chemical structure representing an amide or polyamide.

Another preferred embodiment concerns a composition, wherein each R in FIG. 3, 4 or 5, is one or more group from the list comprising alkyl, alkenyl and alkynyl, comprising 1-40 C-atoms; cycloalkyl, cycloalkenyl, and cycloalkynyl, comprising 5-40 C-atoms; and aryl, comprising 6-40 C-atoms. In another embodiment one or more of each R is substituted with heteroatoms.

Another embodiment concerns a composition according to any of the above embodiments, having a manganese content of at least 0.1% in the polymer, preferably between 2% and 10%. Higher manganese concentrations, such as up to 20% are feasible, though this could reduce alkyd or UPR compatibility without offering any advantage over manganese polymers with a lower manganese content.

Another embodiment concerns a composition according to any of the above embodiments, further comprising one or more solvents, preferably selected from the list comprising white spirits, glycol ethers, alcohols, esters, aromatics, and mixtures thereof. Using such a composition is preferred, as it allows addition to target paints and varnishes in diluted form rather than in a highly viscous or solid form.

Another embodiment concerns a coating composition, comprising a polymer composition according to any of the above embodiments in an amount selected so as to contain 0.0005% to 0.05% of manganese.

Another embodiment concerns the use of the composition according to any of the above embodiments as drier for auto-oxidizable coatings or as accelerator in unsaturated polyester resins.

All percentages are understood to be percentages by weight.

Examples 1 to 22 illustrate the synthesis of polymers according to the invention.

EXAMPLE 1

MNP1

23 parts of dodecanedioic acid and 56 parts of oleic acid are heated under nitrogen blanket to 130° C. for two hours. 9 parts of glycerol are carefully added after which the mixture is heated to 180° C. Water is removed from the reaction medium by means of distillation. To facilitate removal of reaction water, xylene can be used under reflux conditions. After all water is removed, the reaction mixture is cooled to 130° C. 12.3 parts of manganese acetate are carefully added, after which the temperature is raised to 140° C. Acetic acid is removed by means of distillation. Residual acetic acid is removed by vacuum distillation. The resulting liquid manganese polymer, comprising hydrocarbon chains, esters, polyesters and a manganese content of 3.2%, is left to cool and can be diluted with white spirit to the desired concentration.

EXAMPLE 2

MNP2

35 parts of dimeric fatty acids and 35 parts of oleic acid are heated under nitrogen blanket to 130° C. 5.6 parts of glycerol are carefully added after which the mixture is heated to 180° C. Water is removed from the reaction medium by means of distillation. After all water is removed, the reaction mixture is cooled to 130° C. 7.5 parts of manganese acetate are carefully added, after which the temperature is raised to 180° C. Acetic acid is removed by means of distillation. Residual acetic acid is removed by vacuum distillation. The resulting liquid manganese polymer, comprising hydrocarbon chains, esters, polyesters and a manganese content of 2.3%, is left to cool and can be diluted with white spirit to the desired concentration.

EXAMPLE 3

MNP3

57 parts of dimeric fatty acids and 45 parts of oleic acid are heated under nitrogen blanket to 130° C. 9.1 parts of glycerol are carefully added after which the mixture is heated to 180° C. Water is removed from the reaction medium by means of distillation. After all water is removed, the reaction mixture is cooled to 130° C. 12.3 parts of manganese acetate are carefully added, after which the temperature is raised to 180° C. Acetic acid is removed by means of distillation. Residual acetic acid is removed by vacuum distillation. Then 3.4 parts of toluene di-isocyanate are added, and the reaction mix is kept stirring for two hours to allow further polymerization. The resulting manganese polymer, comprising hydrocarbon chains, esters, polyesters, urethanes, polyurethanes and a manganese content of 2.4%, is left to cool and diluted with white spirit to the desired concentration.

EXAMPLE 4

MNP4

35 parts of dimeric fatty acids and 35 parts of Tall Oil Fatty Acids are heated under nitrogen blanket to 130° C. 5.6 parts of glycerol are carefully added after which the mixture is heated to 180° C. Water is removed from the reaction medium by means of distillation. After all water is removed, the reaction mixture is cooled to 130° C. 7.5 parts of manganese acetate are carefully added, after which the temperature is raised to 180° C. Acetic acid is removed by means of distillation. Residual acetic acid is removed by vacuum distillation. The resulting manganese polymer, comprising hydrocarbon chains, esters, polyesters and a manganese content of 2.3%, is left to cool and diluted with white spirit to the desired concentration.

EXAMPLE 5

MNP5

29 parts of dimeric fatty acids and 14 parts of oleic acid are heated under nitrogen blanket to 120° C. 18.4 parts of manganese acetate are carefully added, after which the temperature is raised to 180° C. Acetic acid is removed by means of distillation. Residual acetic acid is removed by vacuum distillation. The resulting manganese polymer, comprising hydrocarbon chains and a manganese content of 8.8%, is left to cool and diluted with white spirit to the desired concentration.

EXAMPLE 6

MNP6

14 parts of adipic acid and 55 parts of dehydrated castor oil fatty acids are heated under nitrogen blanket to 130° C. 9 parts of glycerol are carefully added after which the mixture is heated to 180° C. Water is removed from the reaction medium by means of distillation. After all water is removed, the reaction mixture is cooled to 130° C. 12 parts of manganese acetate are carefully added, after which the temperature is raised to 180° C. Acetic acid is removed by means of distillation. Residual acetic acid is removed by vacuum distillation. The resulting manganese polymer, comprising hydrocarbon chains, esters, polyesters and a manganese content of 3.5%, is left to cool and diluted with white spirit to the desired concentration.

EXAMPLE 7

MNP7

35 parts of dimeric fatty acids and 34 parts of Soybean Oil Fatty Acids are heated under nitrogen blanket to 130° C. 5.7 parts of mono ethylene glycol are carefully added after which the mixture is heated to 180° C. Water is removed from the reaction medium by means of distillation. After all water is removed, the reaction mixture is cooled to 130° C. 7.5 parts of manganese acetate are carefully added, after which the temperature is raised to 180° C. Acetic acid is removed by means of distillation. Residual acetic acid is removed by vacuum distillation. The resulting manganese polymer, comprising hydrocarbon chains, esters, polyesters and a manganese content of 2.3%, is left to cool and diluted with white spirit to the desired concentration.

EXAMPLE 8

MNP8

57 parts of dimeric fatty acids and 45 parts of oleic acid are heated under nitrogen blanket to 130° C. 9 parts of glycerol are carefully added after which the mixture is heated to 180° C. Water is removed from the reaction medium by means of distillation. After all water is removed, the reaction mixture is cooled to 130° C. 12.3 parts of manganese acetate are carefully added, after which the temperature is raised to 180° C. Acetic acid is removed by means of distillation. Residual acetic acid is removed by vacuum distillation. The reaction mixture is cooled to 100° C., 4.4 parts of isophorone diisocyanate are added and the reaction mix is kept stirring for two hours to allow further polymerization. The resulting manganese polymer, comprising hydrocarbon chains, esters, polyesters, urethanes, polyurethanes and a manganese content of 2.4%, is left to cool and diluted with white spirit to the desired concentration.

EXAMPLE 9

MNP9

35 parts of dimeric fatty acids and 35 parts of oleic acid are heated under nitrogen blanket to 130° C. 8.1 parts of trimethylolpropane are carefully added after which the mixture is heated to 180° C. Water is removed from the reaction medium by means of distillation. After all water is removed, the reaction mixture is cooled to 130° C. 7.5 parts of manganese acetate are carefully added, after which the temperature is raised to 180° C. Acetic acid is removed by means of distillation. Residual acetic acid is removed by vacuum distillation. The resulting manganese polymer, comprising hydrocarbon chains, esters, polyesters and a manganese content of 2.2%, is left to cool and diluted with white spirit to the desired concentration.

EXAMPLE 10

MNP10

11.5 parts of dimeric fatty acids, 4.6 parts of dodecanedioic acid, 2.9 parts of adipic acid, 11.3 parts of oleic acid, 11.2 parts of Soybean Oil Fatty Acids and 11.3 parts of dehydrated castor oil fatty acids are heated under nitrogen blanket to 130° C. 5.5 parts of glycerol are carefully added after which the mixture is heated to 180° C. Water is removed from the reaction medium by means of distillation. After all water is removed, the reaction mixture is cooled to 130° C. 7.5 parts of manganese acetate are carefully added, after which the temperature is raised to 180° C. Acetic acid is removed by means of distillation. Residual acetic acid is removed by vacuum distillation. The resulting manganese polymer, comprising hydrocarbon chains, esters, polyesters and a manganese content of 3.0%, is left to cool and diluted with white spirit to the desired concentration.

EXAMPLE 11

MNP11

35 parts of dimeric fatty acids and 35 parts of oleic acid are heated under nitrogen blanket to 130° C. 5.2 parts of glycerol are carefully added after which the mixture is heated to 180° C. Water is removed from the reaction medium by means of distillation. After all water is removed, the reaction mixture is cooled to 160° C. 0.6 parts of hexamethylenediamine are carefully added after which the mixture is heated to 180° C. Water is removed from the reaction medium by means of distillation. After all water is removed, the reaction mixture is cooled to 130° C. 7.5 parts of manganese acetate are carefully added, after which the temperature is raised to 180° C. Acetic acid is removed by means of distillation. Residual acetic acid is removed by vacuum distillation. The resulting manganese polymer, comprising hydrocarbon chains, esters, polyesters, amides, polyamides and a manganese content of 2.3%, is left to cool and diluted with white spirit to the desired concentration.

EXAMPLE 12

MNP12

35 parts of dimeric fatty acids, 17 parts of oleic acid and 18 parts of ricinoleic acid are heated under nitrogen blanket to 130° C. 3.7 parts of glycerol are carefully added after which the mixture is heated to 180° C. Water is removed from the reaction medium by means of distillation. After all water is removed, the reaction mixture is cooled to 130° C. 7.5 parts of manganese acetate are carefully added, after which the temperature is raised to 180° C. Acetic acid is removed by means of distillation. Residual acetic acid is removed by vacuum distillation.

The resulting manganese polymer, comprising hydrocarbon chains, esters, polyesters and a manganese content of 2.5%, is left to cool and diluted with white spirit to the desired concentration.

EXAMPLE 13

MNP13

35 parts of dimeric fatty acids and 35 parts of oleic acid are heated under nitrogen blanket to 130° C. 5.6 parts of glycerol are carefully added after which the mixture is heated to 180° C. Water is removed from the reaction medium by means of distillation. After all water is removed, the reaction mixture is cooled to 115° C. 2.2 parts of manganese oxide are carefully added, after which the temperature is raised to 180° C. Water is removed from the reaction medium by means of distillation. The resulting manganese polymer, comprising hydrocarbon chains, esters, polyesters and a manganese content of 4.4%, is left to cool and diluted with white spirit to the desired concentration.

EXAMPLE 14

MNP14

35 parts of dimeric fatty acids and 35 parts of oleic acid are heated under nitrogen blanket to 130° C. 5.2 parts of glycerol are carefully added after which the mixture is heated to 180° C. Water is removed from the reaction medium by means of distillation. After all water is removed, the reaction mixture is cooled to 160° C. 0.16 parts of polyamide (resin based on tall oil fatty acids) are carefully added after which the mixture is heated to 180° C.

Water is removed from the reaction medium by means of distillation. After all water is removed, the reaction mixture is cooled to 130° C. 7.5 parts of manganese acetate are carefully added, after which the temperature is raised to 180° C. Acetic acid is removed by means of distillation. Residual acetic acid is removed by vacuum distillation. The resulting manganese polymer, comprising hydrocarbon chains, esters, polyesters, polyamides and a manganese content of 2.2%, is left to cool and diluted with white spirit to the desired concentration.

EXAMPLE 15

MNP15

36.5 parts of ricinoleic acid are heated under nitrogen blanket to 130° C. 7.5 parts of manganese acetate are carefully added, after which the temperature is raised to 180° C. Acetic acid and water is removed by means of distillation. Residual acetic acid is removed by vacuum distillation. The reaction mixture is cooled to 80° C., 1.3 parts of isophorone diisocyanate are carefully added and the reaction mix is kept stirring for four hours to allow further polymerization. The resulting manganese polymer, comprising esters, urethanes, polyesters, polyurethanes and a manganese content of 1.7%, is left to cool and diluted with white spirit to the desired concentration.

EXAMPLE 16

MNP16

28 parts of dimeric fatty acids, 2 parts of succinic acid and 34 parts of dehydrated castor oil fatty acids are heated under nitrogen blanket to 130° C. 5.6 parts of glycerol are carefully added after which the mixture is heated to 180° C. Water is removed from the reaction medium by means of distillation. After all water is removed, the reaction mixture is cooled to 115° C. 2.2 parts of manganese oxide are carefully added, after which the temperature is raised to 180° C. Water is removed from the reaction medium by means of distillation. The resulting manganese polymer, comprising hydrocarbon chains, esters, polyesters and a manganese content of 2.5%, is left to cool and diluted with white spirit to the desired concentration.

EXAMPLE 17

MNP17

28 parts of dimeric fatty acids, 2 parts of itaconic acid and 34 parts of dehydrated castor oil fatty acids are heated under nitrogen blanket to 130° C. 5.6 parts of glycerol are carefully added after which the mixture is heated to 180° C. Water is removed from the reaction medium by means of distillation. After all water is removed, the reaction mixture is cooled to 115° C. 2.2 parts of manganese oxide are carefully added, after which the temperature is raised to 180° C. Water is removed from the reaction medium by means of distillation. The resulting manganese polymer, comprising hydrocarbon chains, esters, polyesters and a manganese content of 2.4%, is left to cool and diluted with white spirit to the desired concentration.

EXAMPLE 18

MNP18

29 parts of dimeric fatty acids, 3 parts of benzoic acid and 30 parts of dehydrated castor oil fatty acids are heated under nitrogen blanket to 130° C. 6 parts of mono ethylene glycol are carefully added after which the mixture is heated to 190° C. Water is removed from the reaction medium by means of distillation. After all water is removed, the reaction mixture is cooled to 115° C. 2.2 parts of manganese oxide are carefully added, after which the temperature is raised to 180° C. Water is removed from the reaction medium by means of distillation. The resulting manganese polymer, comprising hydrocarbon chains, aromatic groups, esters, polyesters and a manganese content of 2.5%, is left to cool and diluted with white spirit to the desired concentration.

EXAMPLE 19

MNP19

70 parts of dimeric fatty acids and 68 parts of oleic acid are heated under nitrogen blanket to 130° C. 13 parts of glycerol are carefully added after which the mixture is heated to 180° C. Water is removed from the reaction medium by means of distillation. After all water is removed, the reaction mixture is cooled to 130° C. 7.5 parts of manganese acetate are carefully added, after which the temperature is raised to 180° C. Acetic acid is removed by means of distillation. Residual acetic acid is removed by vacuum distillation. The resulting liquid manganese polymer with a manganese content of 1.2%, is left to react for an additional 8 hours at 160° C. to allow further polymerization, after which it is cooled and diluted with white spirit to the desired concentration. The obtained manganese polymer, comprising hydrocarbon chains, esters and polyesters, has an average molecular weight of over 148.000 Da.

EXAMPLE 20

MNP20

34 parts of dimeric fatty acids, 2 parts of acrylic acid and 27 parts of dehydrated castor oil fatty acids are heated under nitrogen blanket to 130° C. 5.5 parts of glycerol are carefully added after which the mixture is heated to 190° C. Water is removed from the reaction medium by means of distillation. After all water is removed, the reaction mixture is cooled to 120° C. 2.2 parts of manganese oxide are carefully added, after which the temperature is raised to 180° C. Water is removed from the reaction medium by means of distillation. The resulting manganese polymer, comprising hydrocarbon chains, esters, acrylates, polyesters and a manganese content of 2.4%, is left to cool and diluted with white spirit to the desired concentration.

EXAMPLE 21

MNP21

11.5 parts of dimeric fatty acids, 4.6 parts of dodecanedioic acid, 2.9 parts of adipic acid, 11.3 parts of oleic acid, 11.2 parts of Soybean Oil Fatty Acids and 11.3 parts of dehydrated castor oil fatty acids are heated under nitrogen blanket to 130° C. 3.8 parts of manganese acetate are carefully added, after which the temperature is raised to 160° C. Acetic acid is removed by means of distillation. Residual acetic acid is removed by vacuum distillation. After all acetic acid is removed, 6.6 parts of glycerol are carefully added after which the mixture is heated to 180° C. Water is removed from the reaction medium by means of distillation. Residual water is removed by vacuum distillation.

To 100 parts of the resulting manganese polymer, 4 parts of a solution containing 49.9 parts methyl methacrylate, 49.9 parts butanol and 0.2 parts benzoyl peroxide, are added. The reaction temperature is raised to 70° C. Upon completion, the thick acryl-modified manganese polymer (modification at the double bonds of the fatty acid chains), comprising hydrocarbon chains, esters, acrylates, polyesters and polyacrylates, is diluted to the desired concentration.

EXAMPLE 22

MNP22

40 parts of dimeric fatty acids, 2.3 parts of dodecanedioic acid, 1.5 parts of adipic acid, and 22.4 parts of Soybean Oil Fatty Acids are heated under nitrogen blanket to 130° C. 3.8 parts of manganese acetate are carefully added, after which the temperature is raised to 160° C. Acetic acid is removed by means of distillation. Residual acetic acid is removed by vacuum distillation. After all acetic acid is removed, 6.6 parts of glycerol are carefully added after which the mixture is heated to 180° C. Water is removed from the reaction medium by means of distillation. Residual water is removed by vacuum distillation, after which 2 parts of Dow Corning RSN-6018 silicone resin intermediate is added at 180° C. and left to react for 3 hours. The resulting silicone-modified manganese polymer (silicone bonded via the residual OH-groups of the Mn polymer), comprising hydrocarbon chains, esters, polyesters and a manganese content of 1.2%, is left to cool and diluted with white spirit to the desired concentration.

EXAMPLE 23

Preparation of Chelated Polymers

Example 23 illustrates the preparation of driers by combining the synthesized polymers with different ligands.

A manganese polymer solution according to Examples 1 to 22 (MNPx) is carefully heated to 30° C., after which a donor ligand according to Table 1 (Lx) is added in a predetermined L:Mn ratio, and left to react for two hours. The Mn polymer drier (MNPx-Lx) is filtered, after which a clear reddish-brown manganese polymer solution is obtained with a manganese content of about 1% and a broad molecular weight distribution between 700 and more than 10000 Da.

In the general procedure above ratios of ligand to manganese (L:Mn) can range from 0.05:1 to 20:1.

TABLE 1

Overview of the ligands

| Lx | Product |
|---|---|
| L1 | 1,4,7-Trimethyl-1,4,7-triazacyclononane |
| L2 | 6-isopropylamino-1,4,6-trimethyl-1,4-diazacycloheptane |
| L3 | 2,2'-Bipyridine |
| L4 | 1,10-Phenanthroline |
| L5 | N,N'-Bis(salicylidene)ethylenediamine |
| L6 | 1,1,4,7,10,10-Hexamethyltriethylenetetramine |
| L7 | Tris(2-pyridylmethyl)amine |
| L8 | 2-(n-benzyl-n-(2-hydroxyethyl)aminomethyl)-3-hydroxypyridine |
| L9 | 3-hydroxy-2-(morpholinomethyl)-pyridine |
| L10 | 2-(dimethylaminomethyl)-pyridine |
| L11 | 2-(bis-(2-pyridylmethyl)-amino)-ethanol |
| L12 | 1,4,6-trimethyl-6-{N-(pyridin-2-ylmethyl)-N-methylamino}-1,4-diazacycloheptane |
| L13 | 6-amino-1,4,6-trimethyl-1,4-diazacycloheptane |

EXAMPLE 24

Coating Composition

Example 24 illustrates the preparation of coating compositions comprising the driers according to Example 23.

The drying performance of the chelated polymers prepared according to Example 23 are investigated in a white gloss alkyd-based paint formulation based on the commercially available alkyd Valirex® RE070.06.

Herein, the polymer is mixed in the non-siccativated white paint together with secondary calcium- and zirconium-based driers, as commonly done in industrial practice. The mixing ratios are chosen so as to obtain a white gloss paint with a metal content of 0.005% Mn, 0.2% Ca and 0.1% Zr, calculated on resin solids, unless stated differently. Commercially available Valirex® Zr 18% and Valirex® Ca 5% are used as calcium and zirconium sources respectively.

For comparison purposes, reference paint compositions are prepared using commercially available metal-based driers or manganese-based polymers without ligands:
  Reference1, using Valirex® Co 10% (Co-2-ethylhexanoate);
  Reference2, using Nuodex® DryCoat (a bridged di-nuclear non-polymeric Mn-complex);
  Reference3, using Mn acetylacetonate;
  Reference4, using Mn bipyridyl;
  Reference5, using MNPx without ligand;
  Reference6, using Valirex® Mn 10% D60+acetylacetone, with Acac:Mn=25;
  Reference7, using Valirex® Mn 10% D60+bipyridyl, with Bipy:Mn=1; and,
  Reference8, using Mn neodecanoate.

In these compositions, the same metal ratios are implemented, except for the Co-based paint which contains 0.05% cobalt.

The paint compositions are applied onto glass plates with a wet film thickness of 75 μm, and checked for drying time on an Elcometer® 5300 ball type drying time recorder in a controlled climate at 20° C. and 70% relative humidity based on ASTM method D5895. Three drying stages are differentiated:
  Set-to-touch or Solvent-dry, i.e. when the stylus leaves a broad scratch-line in the paint;
  Tack-free or Dust-dry, i.e. when the stylus first starts to tear the film; and,
  Through-dry, i.e. when the stylus leaves no visible mark on the film.

To evaluate the loss-of-dry, siccativated paints are stored under ambient conditions during a period of at least 1 month, and up to 1 year, after which the drying performance is re-evaluated.

To evaluate yellowing, 90 μm coatings are applied onto glass plates, which were stored in the dark. The yellowing, quantified by the b* coordinate (*b-value) in the CIELAB color space model, is measured with a Minolta Chroma meter CR-200.

Tables 2, 3, 4, 5, 6, and 7 illustrate the results obtained using the coating compositions according to example 24.

TABLE 2

Drying times (minutes) of different manganese polymers (L:Mn = 1)

| Paint Drier | Set-to-touch | Tack-free | Through-dry |
|---|---|---|---|
| Reference 1 | 18 | 169 | 359 |
| Reference 2 | 14 | 199 | 344 |
| MNP1-L1 | 50 | 134 | 279 |
| MNP2-L1 | 17 | 129 | 395 |
| MNP3-L1 | 25 | 156 | 272 |
| MNP4-L1 | 34 | 235 | 355 |
| MNP5-L1 | 17 | 139 | 380 |
| MNP6-L1 | 32 | 208 | 340 |
| MNP7-L1 | 38 | 183 | 291 |
| MNP8-L1 | 17 | 130 | 214 |
| MNP9-L1 | 31 | 169 | 382 |
| MNP10-L1 | 25 | 159 | 390 |
| MNP11-L1 | 30 | 164 | 298 |
| MNP12-L1 | 28 | 150 | 350 |
| MNP13-L1 | 30 | 150 | 276 |
| MNP14-L1 | 15 | 160 | 377 |
| MNP15-L1 | 33 | 164 | 480 |
| MNP16-L1 | 10 | 266 | 383 |
| MNP17-L1 | 14 | 257 | 390 |
| MNP18-L1 | 43 | 137 | 254 |
| MNP19-L1 | 32 | 160 | 286 |
| MNP20-L1 | 36 | 160 | 229 |
| MNP21-L1 | 23 | 246 | 341 |
| MNP22-L1 | 21 | 224 | 292 |

TABLE 3

Drying times (minutes) of manganese polymers (L:Mn = 1) using different ligands

| Paint Drier | Set-to-touch | Tack-free | Through-dry |
|---|---|---|---|
| Reference 1 | 18 | 169 | 359 |
| Reference 2 | 14 | 199 | 344 |
| Reference 5 MNP2 w/o ligand | 41 | 689 | 1140 |
| MNP2-L1 | 17 | 129 | 395 |
| MNP2-L2 | 26 | 305 | 695 |
| MNP2-L3 | 21 | 170 | 461 |
| MNP2-L4 | 20 | 182 | 483 |
| MNP2-L5 | 15 | 182 | 393 |
| MNP2-L6 | 25 | 380 | 699 |
| MNP2-L7 | 22 | 117 | 294 |
| MNP2-L8 | 25 | 226 | 381 |
| MNP2-L9 | 27 | 333 | 616 |
| MNP2-L10 | 27 | 271 | 476 |
| MNP2-L11 | 9 | 244 | 359 |
| MNP2-L12 | 16 | 183 | 272 |
| MNP2-L13 | 26 | 320 | 642 |
| Reference 5 MNP8 w/o ligand | 46 | None | None |
| MNP8-L1 | 17 | 130 | 214 |
| MNP8-L3 | 20 | 250 | 451 |
| MNP8-L5 | 17 | 131 | 293 |
| MNP8-L12 | 16 | 182 | 325 |
| Reference 5 MNP15 w/o ligand | 40 | None | None |
| MNP15-L1 | 33 | 164 | 480 |
| MNP15-L12 | 21 | 181 | 319 |

TABLE 4

Impact of L:Mn ratio on drying times (minutes) of manganese polymers

| Paint Drier | Set-to-touch | Tack-free | Through-dry |
|---|---|---|---|
| Reference 1 | 18 | 169 | 359 |
| Reference 5 MNP2 w/o ligand | 25 | 689 | 1140 |
| MNP2-L1, L1:Mn = 0.1 | 22 | 414 | 732 |
| MNP2-L1, L1:Mn = 0.25 | 17 | 325 | 535 |
| MNP2-L1, L1:Mn = 1.0 | 17 | 129 | 395 |
| MNP2-L2, L2:Mn = 1.0 | 26 | 305 | 695 |
| MNP2-L2, L2:Mn = 2.0 | 37 | 264 | 487 |
| MNP2-L6, L6:Mn = 1.0 | 25 | 380 | 699 |
| MNP2-L6, L6:Mn = 5.0 | 11 | 366 | 600 |
| MNP2-L6, L6:Mn = 10 | 20 | 325 | 475 |
| MNP2-L6, L6:Mn = 20 | 27 | 245 | 414 |
| MNP2-L7, L7:Mn = 0.25 | 16 | 378 | 515 |
| MNP2-L7, L7:Mn = 0.5 | 18 | 272 | 341 |
| MNP2-L7, L7:Mn = 1.0 | 22 | 117 | 294 |
| MNP2-L9, L9:Mn = 1.0 | 27 | 333 | 616 |
| MNP2-L9, L9:Mn = 10 | 15 | 287 | 442 |
| MNP2-L12, L12:Mn = 0.1 | 18 | 450 | 517 |
| MNP2-L12, L12:Mn = 0.25 | 13 | 390 | 473 |
| MNP2-L12, L12:Mn = 0.5 | 13 | 263 | 431 |
| MNP2-L12, L12:Mn = 1.0 | 16 | 183 | 272 |
| MNP2-L13, L13:Mn = 1.0 | 26 | 320 | 642 |
| MNP2-L13, L13:Mn = 10 | 26 | 115 | 306 |
| Reference 5 MNP15 w/o ligand | 40 | None | None |
| MNP15-L1, L1:Mn = 0.1 | 35 | 515 | 720 |
| MNP15-L1, L1:Mn = 0.25 | 39 | 317 | 527 |
| MNP15-L1, L1:Mn = 0.5 | 35 | 290 | 430 |
| MNP15-L1, L1:Mn = 1.0 | 33 | 164 | 480 |

TABLE 5

Impact of manganese content on drying times (minutes)

| Paint Drier | Set-to-touch | Tack-free | Through-dry |
|---|---|---|---|
| Reference 1 | 18 | 169 | 359 |
| MNP1-L1 (L1:Mn = 8), 0.005% Mn | 17 | 129 | 247 |
| MNP1-L1 (L1:Mn = 8), 0.0025% Mn | 27 | 145 | 362 |
| MNP1-L1 (L1:Mn = 8), 0.002% Mn | 25 | 160 | 395 |
| MNP1-L1 (L1:Mn = 8), 0.0012% Mn | 31 | 190 | 411 |
| MNP1-L1 (L1:Mn = 8), 0.0006% Mn | 38 | 298 | 571 |
| MNP1-L1 (L1:Mn = 4), 0.0025% Mn | 10 | 186 | 393 |
| MNP1-L1 (L1:Mn = 4), 0.002% Mn | 11 | 179 | 399 |
| MNP1-L1 (L1:Mn = 4), 0.0012% Mn | 12 | 226 | 442 |
| MNP1-L1 (L1:Mn = 4), 0.0006% Mn | 12 | 340 | 669 |

As can be seen from the drying data in Tables 2 and 3, the chelated manganese polymers are very active towards the oxidative drying of alkyd-based paints. Even at manganese concentrations of 0.005% on resin solids. This concentration is 10 times lower than what is typically used with cobalt, while the drying performance remains in line with that of cobalt. Some examples of manganese-based polymers even outperform the cobalt-based driers. It can also be seen that the manganese polymers without chelating nitrogen-ligands perform poorly.

From the results presented in Tables 4 and 5, it is apparent that the ligand to manganese ratio, and thus the extent to which manganese is activated by such nitrogen-containing ligands, has a significant impact on the drying performance. Even if the ligand to manganese ratio is very low, the drying performance significantly improves in comparison to non-chelated polymers. Depending on the polymer, the type of ligand, and the paint composition, the optimum ligand to manganese ratio can vary, though in general, higher ratios typically give enhanced drying performance. On the other hand, from an economic point of view, lower ratios are preferred. From Table 5, it can also be seen that the concentration of manganese present in the coating can be significantly decreased by increasing the ligand to manganese ratio.

TABLE 6

Drying times (minutes) of manganese polymers showing the influence of storage time (L:Mn = 1, unless stated differently)

| Paint Drier | Set-to-touch | Tack-free | Through-dry |
|---|---|---|---|
| Reference 2-Fresh | 14 | 199 | 344 |
| Reference 2-6 months | 34 | 290 | 558 |
| Reference 2-1 year | 20 | 220 | 730 |
| Reference 6-Fresh | 10 | 228 | 338 |
| Reference 6-1 month | 10 | 777 | 962 |
| Reference 7-Fresh | 29 | 217 | 407 |
| Reference 7-9 days | 29 | 388 | 590 |
| Reference 7-1 month | 30 | 460 | 681 |
| Reference 5 MNP2 w/o ligand-Fresh | 17 | 689 | 1140 |
| Reference 5 MNP2 w/o ligand-1 month | 20 | 750 | None |
| MNP2-L1-Fresh | 17 | 129 | 395 |
| MNP2-L1-6 months | 12 | 115 | 299 |
| MNP2-L1-1 year | 25 | 91 | 262 |
| MNP2-L6 (L6:Mn = 10)-Fresh | 20 | 325 | 475 |
| MNP2-L6 (L6:Mn = 10)-6 months | 32 | 303 | 454 |
| MNP2-L7-Fresh | 30 | 143 | 461 |
| MNP2-L7-7 months | 31 | 107 | 302 |
| MNP2-L11-Fresh | 9 | 244 | 359 |
| MNP2-L11-7 months | 19 | 215 | 360 |
| MNP8-L1-Fresh | 17 | 130 | 214 |
| MNP8-L1-9 months | 18 | 170 | 278 |
| MNP8-L12-Fresh | 16 | 182 | 325 |
| MNP8-L12-9 months | 9 | 171 | 320 |
| MNP15-L1-Fresh | 24 | 155 | 471 |
| MNP15-L1-1 month | 24 | 153 | 469 |
| MNP15-L1-5 months | 34 | 175 | 279 |

As can be seen from the drying data given in Table 6, the disclosed manganese coordination polymers don't reveal any significant LOD, not even after one year of maturation. This is a remarkable advance in comparison to conventional manganese complexes, which clearly reveal a significant LOD. For example, the tested Reference 6 and 7 show pronounced LOD already after some days, indicated by prolonged tack-free and through-dry times. For Reference 2 this becomes especially visible in case of the measured through-dry time after some months.

As already stated above, manganese polymers without chelating ligands perform poorly as driers, but also reveal significant LOD under the same conditions, e.g. Reference 5. This is clearly not the case for their analogues with chelating ligands, e.g. examples MNP2-L1, MNP2-L6, MNP2-L7, MNP2-L11, MNP8-L1, MNP8-L12 or MNP15-L1.

TABLE 7

Yellowing (*b-values) of Mn polymers
(0.005% Mn) in function of time (days)

| Paint Drier | 1 | 7 | 15 | 30 | 53 | 138 |
|---|---|---|---|---|---|---|
| Reference 1 | 0.25 | −0.56 | −0.55 | −0.28 | −0.09 | 1.33 |
| Reference 2 | −0.55 | −0.12 | 0.61 | 0.81 | 1.18 | 3.48 |
| MNP2-L1 | −0.59 | −0.46 | −0.37 | −0.26 | −0.14 | 0.64 |
| MNP2-L7 | −0.65 | −0.27 | −0.16 | −0.05 | 0.1 | 1.02 |
| MNP2-L11 | −0.38 | −0.39 | −0.34 | −0.31 | −0.16 | −0.02 |
| MNP2-L12 | −0.59 | −0.44 | −0.47 | −0.40 | −0.37 | 0.26 |

The results for yellowing of manganese polymers in function of time as shown in Table 7 are considered very satisfactory. The low *b-values indicate that the paint coatings remain blueish-white to white. Surprisingly, the *b-value for the cobalt-containing white paint (Reference 1) is higher than that of the manganese-containing white paints after several months, indicating faster yellowing of the former. Usually, manganese tends to cause more yellowing than cobalt. Also, the bridged di-nuclear manganese complex (reference 2) shows already a significantly faster yellowing after only a few weeks as compared to the tested manganese polymers.

It is assumed that further yellowing reduction over prolonged time can be achieved by reducing the manganese content in the coatings.

EXAMPLE 25

Manganese Leaching

The solubility of manganese in distilled water is tested according to the flask method in the OECD 105 guideline. The results are given in Table 8.

TABLE 8

Fraction of manganese (%) leaching from the manganese
compounds as a function of time (days) in water

| Paint Drier | Time submerged in water | | |
|---|---|---|---|
| | 1 day | 2 days | 3 days |
| Reference 2 | 63 | 63 | 63 |
| Reference 8 | 22 | 30 | 31 |
| MNP2-L1 | 0.3 | 0.3 | 0.3 |
| MNP3-L1 | 0.5 | 0.7 | 0.8 |
| MNP6-L1 | 5 | 5 | 5 |
| MNP7-L1 | 0.3 | 0.3 | 0.3 |
| MNP8-L1 | 0.3 | 0.3 | 0.3 |
| MNP9-L1 | 0.5 | 0.5 | 0.5 |
| MNP11-L1 | 0.1 | 0.2 | 0.4 |
| MNP12-L1 | 0.2 | 0.2 | 0.2 |
| MNP14-L1 | 0.2 | 0.3 | 0.3 |
| MNP16-L1 | 0.6 | 0.6 | 0.6 |
| MNP17-L1 | 0.3 | 0.3 | 0.3 |
| MNP18-L1 | 0.3 | 0.3 | 0.3 |
| MNP19-L1 | 0.0 | 0.0 | 0.4 |
| MNP20-L1 | 0.1 | 0.1 | 0.1 |
| MNP22-L1 | 0.2 | 0.2 | 0.2 |

As can be seen in Table 8, the amount of manganese leaching from the manganese polymers into water is very low. This is in sharp contrast to the bridged di-nuclear Mn-complex (Reference 2) and Mn neodecanoate (Reference 8). Less than 10% of manganese leaching out of the manganese polymers into water is considered acceptable; less than 1% is preferred. The values for the manganese polymers are on average about 200 times lower than those of Reference 2, indicating their high stability.

EXAMPLE 26

Unsaturated Polyester Resin (UPR)

The catalytic performance of the manganese polymers made according to Example 23 is investigated in a commercially available unsaturated polyester resin, POLYLITE® 415-000 from Reichhold. Before use, all cobalt and manganese accelerators are first diluted with white spirit to 1% metal. As a peroxide initiator, Peroxan ME-50 L is used. This is a commercially available general-purpose methyl ethyl ketone peroxide from Pergan.

Samples of 100 g POLYLITE® 415-000 resin are promoted with 100 ppm accelerator (based on metal) and then initiated with 1% Peroxan ME-50 L. The mixture is vigorously stirred for 30 seconds, after which the gelling is monitored with a Brookfield Model DV-III Ultra Rheometer equipped with a SC4-27 spindle.

TABLE 9

Gel time, peak exotherm time (minutes) and peak
exotherm temperature (°C.) of unsaturated polyester resin
catalyzed by manganese polymers

| Accelerator | Gel Time | Peak exotherm time | Peak exotherm temp |
|---|---|---|---|
| Reference 1 | 4.4 | 10.4 | 147 |
| MNP2-L1 | 2.8 | 6.2 | 48 |
| MNP2-L11 | 79 | 148 | 121 |
| MNP2-L12 | 13.9 | 45.2 | 135 |

Tables 9 illustrates the results obtained using the unsaturated polyester composition according to Example 26.

As can be seen, the disclosed manganese polymers can also be used as accelerators for unsaturated polyester resins. Changing the ligand has a significant impact on the curing rate. Both fast and delayed curing can be achieved.

The invention claimed is:

1. Composition for use as drier in auto-oxidizable coatings or as accelerator in unsaturated polyester resins, comprising:
   a manganese-bearing polymer having a repeating unit according to:

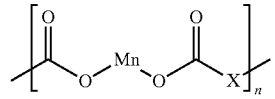

wherein X is one or more groups from the list comprising a hydrocarbon chain, an ester, a polyester, an amide, and a polyamide;
   wherein n≥2; and,
   at least one donor ligand from the list comprising bidentate, tridentate, pentadentate, and hexadentate nitrogen ligands comprising at least two chelating nitrogen atoms.

2. A composition according to claim 1, wherein the donor ligand is one or more of:

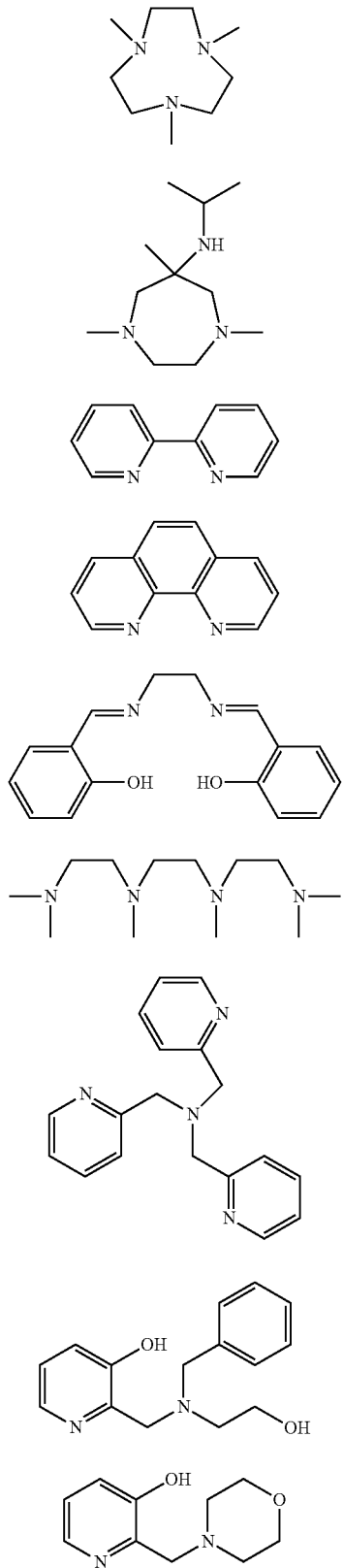

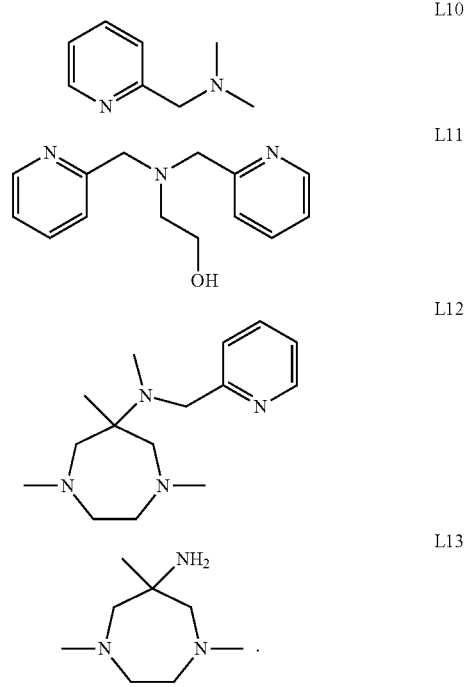

3. A composition according to claim 1, wherein the molar ratio of ligand to manganese is at least 0.005.

4. A composition according to claim 3, wherein the molar ratio of ligand to manganese is between 0.2 and 10.

5. A composition according to claim 1, wherein group X is an ester or polyester according to:

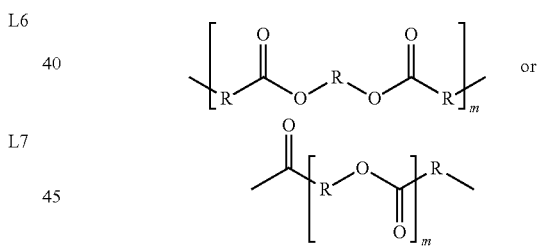

with $m \geq 1$ and, wherein each R is one or more group from the list comprising:

alkyl, alkenyl, and alkynyl, comprising 1-40 C;

cycloalkyl, cycloalkenyl, and cycloalkynyl, comprising 5-40 C; and, aryl, comprising 6-40 C.

6. A composition according to claim 1, wherein group X is an amide or polyamide according to:

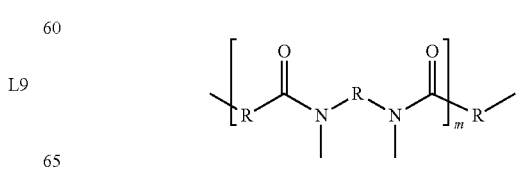

with m≥1 and, wherein each R is one or more group from the list comprising:
- alkyl, alkenyl, and alkynyl, comprising 1-40 C;
- cycloalkyl, cycloalkenyl, and cycloalkynyl, comprising 5-40 C; and,
- aryl, comprising 6-40 C.

7. A composition according to claim 5, wherein one or more of each R is substituted with heteroatoms.

8. A composition according to claim 1, having a manganese content of at least 0.1%.

9. A composition according to claim 1, further comprising one or more solvents selected from the group consisting of white spirits, glycol ethers, alcohols, esters, aromatics, and mixtures thereof.

10. A coating composition comprising a drier composition according to claim 1 in an amount selected so as to contain 0.0005% to 0.05% of manganese.

11. An auto-oxidizable coating comprising the composition according to claim 1 as a drier.

12. An unsaturated polyester resin comprising the composition according to claim 1 as an accelerator.

\* \* \* \* \*